United States Patent [19]

Inose et al.

[11] 4,156,928
[45] May 29, 1979

[54] PROGRAMMABLE TELEVISION GAME AND TRAINING SYSTEM WITH ADAPTABLE OPERATOR CONTROL

[75] Inventors: Fumiyuki Inose, San Jose; Hirohido Endo; Akio Komatsu, both of Cupertino, all of Calif.

[73] Assignee: Hitachi, Ltd., Tokyo, Japan

[21] Appl. No.: 790,077

[22] Filed: Apr. 22, 1977

[51] Int. Cl.² .......................... G06F 3/02; A63F 9/00
[52] U.S. Cl. .................................... 364/900; 273/1 E; 273/138 A; 273/DIG. 28
[58] Field of Search ................. 364/900 MS File; 340/324 AD; 273/85 G, DIG. 28, 1 E, 138 A; 35/8 A

[56] References Cited

U.S. PATENT DOCUMENTS

| | | | |
|---|---|---|---|
| 3,381,276 | 4/1968 | James | 364/900 |
| 3,573,749 | 4/1971 | Smith et al. | 364/900 |
| 3,605,285 | 9/1971 | Bendaniel et al. | 35/8 A |
| 3,728,480 | 4/1973 | Baer | 273/1 E X |
| 3,921,161 | 11/1975 | Baer | 273/DIG. 28 X |
| 3,971,925 | 7/1976 | Winninger et al. | 364/900 |
| 4,026,555 | 5/1977 | Kirschner et al. | 273/85 R |
| 4,028,538 | 6/1977 | Olander, Jr. et al. | 364/900 X |
| 4,053,740 | 10/1977 | Rosanthal | 364/900 X |

OTHER PUBLICATIONS

System 900 for Computerized Ordering-Electronics Laboratories, 1971, EL 609, 4 pages.

*Primary Examiner*—Harvey E. Springborn
*Attorney, Agent, or Firm*—Jackson & Jones

[57] ABSTRACT

A television-connected microprocessor system designed for use primarily as a television game or education system. The system is designed to accept source programming from cartridges that are interchangeable. The cartridges utilize either a ROM or a RAM to store the source programming. The source program is stored in the cartridge ROM or RAM in a higher level language, such as BASIC and interpreted for use by the microprocessor. Each ROM cartridge comes with a keyboard entry device as an integral part thereof which is uniquely adapted to the programming in the cartridge and the games or training sequence dictated thereby. By using a RAM cartridge, the user may enter his own source program by way of a general purpose keyboard or a tape recorder. Keyboard overlays are utilized to adapt the general purpose keyboard to the particular game or training sequence dictated by the source program entered into the cartridge RAM by the user.

3 Claims, 10 Drawing Figures

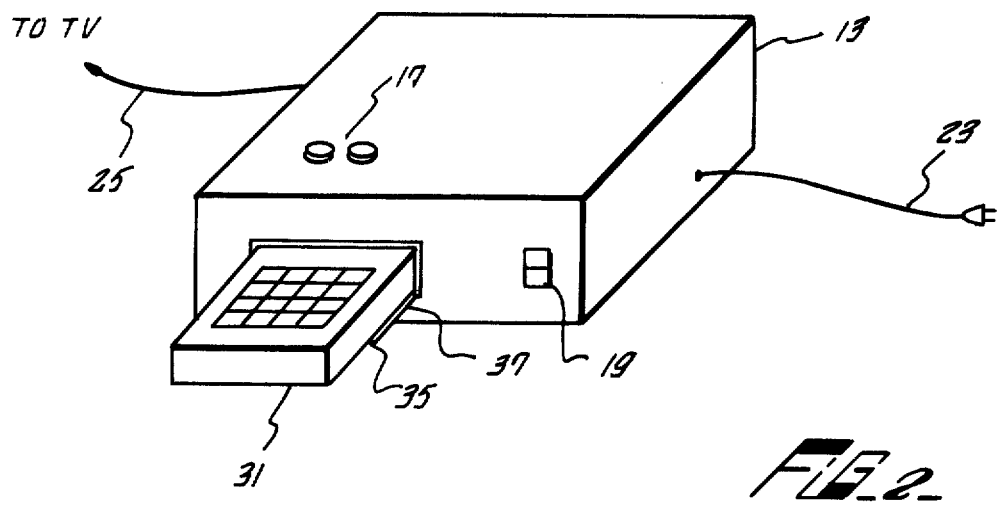
FIG_2.
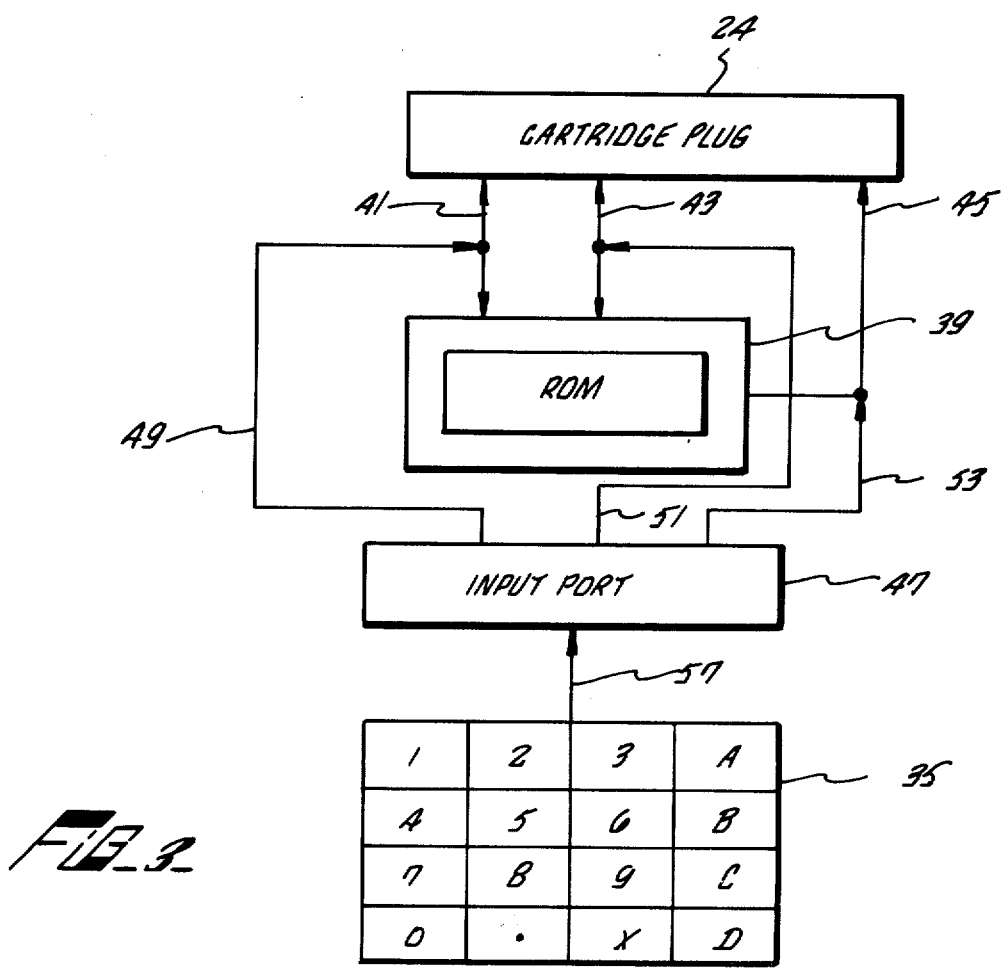
FIG_3.

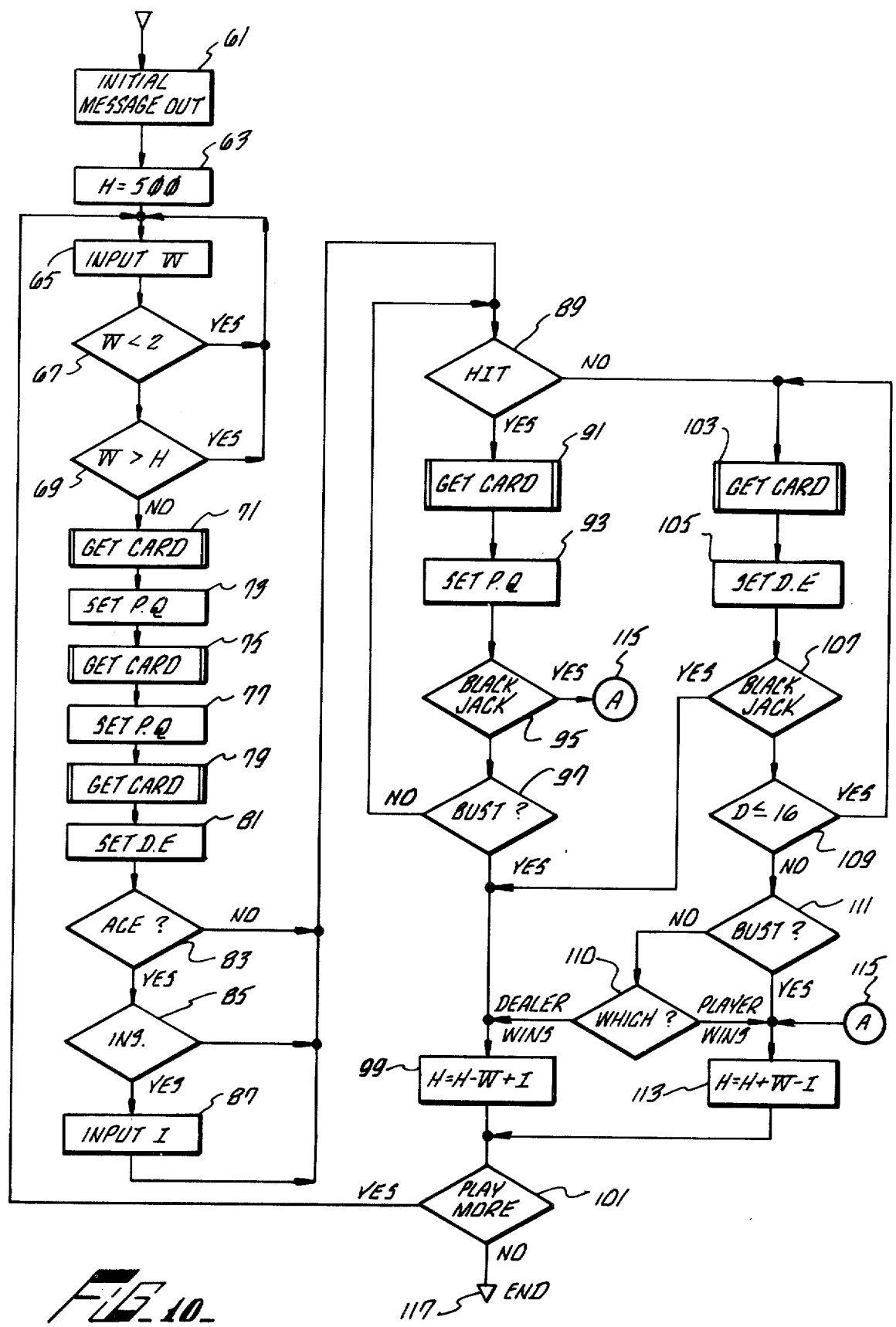

PROGRAMMABLE TELEVISION GAME AND TRAINING SYSTEM WITH ADAPTABLE OPERATOR CONTROL

BACKGROUND OF THE INVENTION

The present invention relates generally to improvements in microprocessor controlled television game and training systems and more particularly, pertains to new and improved television game and training systems utilizing memory cartridges for changing the function of the system.

Television game and training systems which may utilize memory cartridge loaded user-programs have hitherto provided little or no flexibility in the input control to the system. That is, even though the user-programming for a system may be changed by changing the user-program cartridge, the input data control to the system, such as a keyboard, joy stick, switches, etc., may not be directly related to the new programming on the new user-program cartridge. The present invention overcomes the problem of associating the data input device with the game or training sequence dictated by programming loaded into the system.

OBJECTS AND SUMMARY OF THE INVENTION

An object of this invention is to provide a microprocessor based television game or training system that provides the user with a wide choice of games or training sequences.

Another object of this invention is to provide a microprocessor based television game or training system that utilizes an adaptable user control, which is easily adaptable to the game or training sequence to be executed.

Another object of this invention is to provide a microprocessor based television game or training system that facilitates the user entering or devising his own programs and providing the user the ability to adapt the user controls of the system to the game or training sequence entered.

These objects and the general purpose of this invention are accomplished as follows. The game or training system accepts source programming from a cartridge solid state memory. The cartridge contains semiconductor ROM or RAM storage devices. Each ROM cartridge has a keyboard data entry device associated with it which is uniquely adapted to the game or training sequence defined by the source program contained therein. The RAM cartridges may have source programs written into them by the general purpose keyboard on the system housing or from tape or an auxiliary keyboard. When the user enters the source programs into the system, keyboard overlays are used to adapt the general purpose keyboard to the game or training sequence dictated by the source program entered. The source program is stored in the code of a higher level language, such as BASIC.

BRIEF DESCRIPTION OF THE DRAWINGS

Other objects and many of the attended advantages of this invention will be readily appreciated as the same becomes understood by reference to the following detailed description when considered in conjunction with the accompanying drawings in which like reference numerals designate like parts throughout the figures thereof and wherein.

FIG. 2 is a perspective illustration of a preferred embodiment of the present invention;

FIG. 3 is a block diagram illustrating the cartridge element shown in perspective in FIG. 2;

FIG. 4 is an abstract illustration of a keyboard layout to be used with the present invention;

FIG. 5 is an abstract illustration of a keyboard layout for number input purposes;

FIG. 6 is an abstract illustration of a keyboard layout for character input;

FIG. 7 is an abstract illustration of keyboard code assignments;

FIG. 8 is an abstract illustration of a keyboard layout for the game blackjack.

FIG. 9 is an illustration of a keyboard overlay for the game blackjack.

FIG. 10 is a flow chart illustrating the program for the game blackjack.

DESCRIPTION OF THE PREFERRED EMBODIMENT

Figure 1:
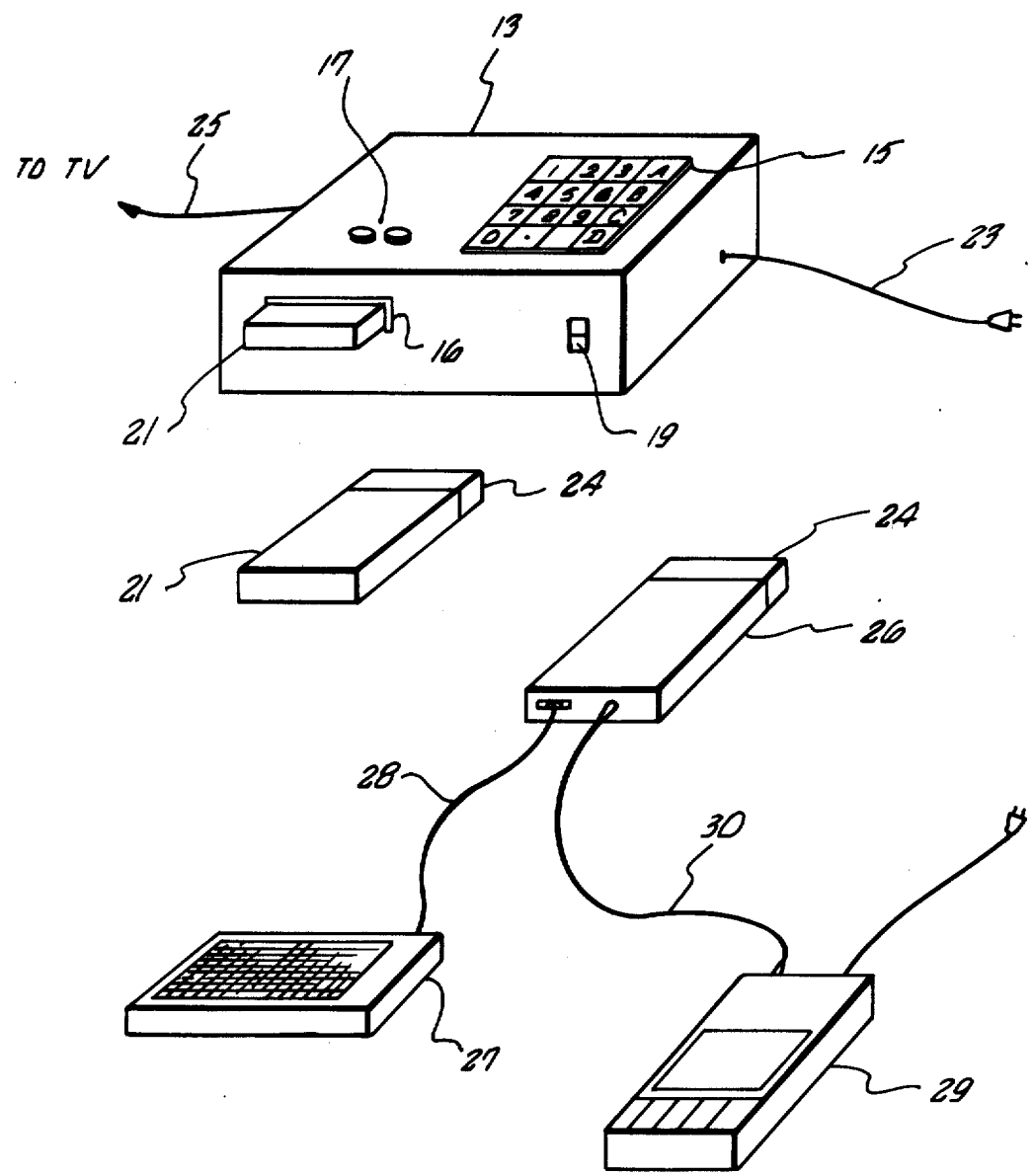
FIG. 1 is a perspective illustration of the basic modular elements in the system according to the present invention.

Referring first to FIG. 1, a modular television game and training system is illustrated. The main control module 13 accepts a user-program cartridge 21 and may have thereon a 16-point keyboard 15, an on/off switch 19 and several control switches 17. The legend on keyboard 15 is generalized and exemplary only, and should not be considered as limiting. A power cord 23 supplies power to the unit, which is in turn connected by way of cables 25 to the appropriate point (the antennae terminals, for example) on a standard home television unit. The user-program cartridge 21 may be a read-only memory (ROM) type cartridge, wherein a solid-state integrated-circuit memory permanently stores the user program to be executed by the system. A cartridge plug 24 connects the user-program cartridge 21 to the circuitry of the main module 13 by way of a mating cartridge socket 16.

A user wishing to change the game or training sequences of the system would replace the ROM cartridge with a ROM cartridge having programs for a different game or training sequences to be executed by the system. These training sequences or game user programs are stored at a higher level language as is more clearly explained in the co-pending patent application for PROGRAMMABLE TELEVISION GAME AND TRAINING SYSTEM, having U.S. Ser. No. 790,076, filed Apr. 22, 1977.

In order to adapt the general 16-point keyboard 15 to the different games or training sequences that can be executed as a result of changing the ROM cartridges 21, the user applies a keyboard overlay to keyboard 15 in the form illustrated in FIG. 9. This overlay redefines the user entry points of the keyboard 15 to the user in a manner that correlates to the game or training sequence defined by the programming on the ROM cartridge 21.

The versatility of the system is greatly increased if a memory cartridge 26, having a random-access integrated circuit memory, is utilized therein. The cartridge plug 24 for this RAM cartridge is identical as the plug for the ROM cartridge 21 and, therefore, can be substituted therefor. The RAM cartridge 26 provides the ability to the user of entering his own user programming either by an additional keyboard 27 over cables 28 or by a recorder 29 over cables 30 or by use of the general purpose 16-point keyboard 15 on the main module 13. The programming stored in the RAM cartridge 26 is stored at a higher level language, such as Basic, for example. One type of Basic that may be used is fully described in the December 1976 issue of "Interface Age", pages 92-98, which language was designed for the 8080 microprocessor used in the system of FIG. 1.

By using the RAM cartridge 26, not only does the user not have to buy additional cartridges if he wishes to change his programming, but he has the capability of devising his own games and training sequences. The higher level language with which the user is working is relatively simple to understand and work with. An example of a simple game program that may be devised will be provided later on.

Each time the user program in the RAM cartridge 26 is changed, the 16-data point keyboard 15 can be adapted to reflect the new game or training sequence defined by the programming stored in the RAM cartridge 26 by keyboard overlays. Therefore, a user can purchase a hard copy program along with the keyboard overlay for the game or training sequence defined by that program rather than buying an entire ROM cartridge 21 when he desires his system to execute a new and different game or training sequence. By addition of the tape recorder 29, programming could also be purchased on tape and entered into the RAM cartridge 26 in this manner. The tapes which could be in cassette form could also read the program stored on the RAM cartridge 26 and, therefore, the user will be able to build up a library of games and training sequences. It should be remembered that the system of FIG. 1 which is more specifically described in the aforementioned co-pending U.S. application for PROGRAMMABLE TELEVISION GAME AND TRAINING SYSTEM contains a higher level language interpreter therein for reducing the user-program to object code for execution by the 8080 microprocessor utilized therein.

An alternate preferred embodiment of an adaptable user control, according to the present invention, is illustrated in FIGS. 2 and 3. FIG. 2 shows the utilization of a ROM cartridge 31 which stores the user program therein. Such a cartridge has a data point entry keyboard 35 (having a generalized exemplary legend thereon) mounted on the cartridge itself. A pedestal 37 supports the cartridge 31 in a manner which permits the user to punch the data point entry keys on the keyboard 35 without dislodging the cartridge from its socket.

The cartridge plug 24 (FIG. 3) of the ROM data entry cartridge 31 is compatible with the cartridge socket of the main module 13. The construction of the cartridge 31 is similar to the construction illustrated in co-pending patent application for PROGRAMMABLE TELEVISION GAME AND TRAINING SYSTEM in that an address bus 41, control bus 43, and eight-line data bus 45 communicate with a ROM 39. In addition, an input port 47 interfaces the 16-data point keyboard 35 to the cartridge plug 24 for connection to the 8080 microprocessor and the associate control circuits of the ROM 39. Cables 57 connect the keyboard 35 to the input port 47. The input port 47, in turn, is connected to the cartridge plug 24 and the ROM 39 by way of cables 49, 51 and 53.

The legend for a preferred general application 16-point keyboard to be used with the present invention is illustrated in FIG. 4. This keyboard can be used to execute games or training sequences that are written in the higher level Basic language and stored in Basic code in the memory cartridge. The keyboard data points are divided into basically two categories of parameters, a number parameter and a function parameter. A number is defined as a string of digits having a certain value. A function is defined as a character that represents a function assigned to that character by the user program. The interpreter program of the system receives the user program statements in Basic code and causes them to be transformed into one or more machine code statements. The article in "Interface Age", entitled Dr. Wang's Palo Alto Tiny Basic, provides a more complete explanation of a higher level language that may be utilized in the present invention. Basically, there are two types of statements that can be made in the Basic language. An input variable "X", which is a number, and an input variable "$", which is a particular function. The interpreter when encountering an input "X" or input "$" statement obtains the number or character and assigns it to the variable. The number or character is directed by the user program as a result of a parameter input by the player on his keyboard.

Referring to FIG. 5, the particular data points of the general purpose keyboard of FIG. 4 that reflects number inputs are shown. The keys "7", "8", "9", "4", "5", "6", "1", "2", "3", "0", "−", "enter", or "←" (delete) are utilized for entering variable numbers from −32767 to +32767. FIG. 6 illustrates a keyboard that may be used to enter various functions which are defined by the user program. When a player hits any of the function keys of the keyboard of FIG. 6, the interpreter program determines which function has been designated by the code that is generated as a result of the key being hit, and assigns that function to the variable of the basic program. FIG. 7 illustrates the various codes utilized to identify the 16 functions available on the keyboard of FIG. 6. The function codes are illustrated as being in hexidecimal notation.

An example of the relative simplicity with which a user can write a program for a game when a higher level basic language is used is illustrated below:

```
10 PRINT "WHAT LIMIT DO YOU WANT?";
12 INPUT L
14 X=RND (L)
16 N=1
18 PRINT N, "GUESS WHAT THE NUMBER IS...";
20 INPUT Y
22 IF Y>φ THEN GOTO 28
24 PRINT "THE NUMBER IS GREATER THAN ZERO ∝"
26 GOTO 18
28 IF Y=X THEN GOTO 38
30 IF Y>X THEN PRINT "TOO HIGH."
32 IF Y<X THEN PRINT "TOO LOW."
34 N=N+1
36 GOTO 18
38 PRINT "THAT'S IT ∝ YOU GOT IT IN", N, "TRIES."
40 PRINT "DO YOU WANT TO PLAY SOME MORE?";
42 INPUT $
44 IF $=1 THEN GOTO 10
46 PRINT "BYE ∝"
48 END
```

The above program is a game which may be called "Guess". Basically, the game involves the computer choosing a random integer between 0 and a limit the player sets. The player must then try to guess the number chosen by the computer. Upon initialization of the game, statement 10 causes the computer to print on the CRT "WHAT LIMIT DO YOU WANT?". The player will input an upper limit L. The computer then chooses a random number "X" in response to statement 14. The random number "X" will be between between 0 and the upper limit L entered by the user. The computer then notes as the result of statement 16, that the player must make a first try at guessing the number. At statement 18 the computer prints on the CRT "GUESS WHAT THE NUMBER IS...". At statement 20 the player enters an integer with his keyboard which is between 0 and the upper limit L. The player would do this by hitting a series of digit keys, such as 1, 2, 3. If a mistake is made during entry the erase key "←" may be punched to erase the last entered digit. Upon the players first integer Y being entered, the program determines if it is greater than 0 as the result of statement 22. If it is, then the program proceeds to statement 28. If the variable Y is equal to the variable X chosen at random by the computer then the program goes to statement 38 which prints "THAT'S IT! YOU GOT IT IN", N, "TRIES". The next statement then would be printing of "DO YOU WANT TO PLAY SOME MORE?". The next statement is a function input "$". If this function input is equal to 1, then the answer is yes and the program will go to the beginning, statement 10. If it is not equal to 1, then the answer is no and the program will print "BYE!" and END.

Statements 30 and 32 are comparison statements and take care of the situation where the player did not guess the random number X chosen by the computer and it is either too high or too low. In response to a comparison, the computer will print the appropriate comment "TOO HIGH" or "TOO LOW" on the CRT. The program will then note at statement 34 that a second try is about to begin. At statement 36, the program will go back to statement 18 and print on the CRT screen "GUESS WHAT THE NUMBER IS...". The player in response thereto will try again and input another integer variable Y at step 20. The program will then proceed to step 22, and so on.

If the player now wishes to change the type of game that can be played on the system, he may, according to the present invention, buy another ROM cartridge, which has a different keyboard attached thereto. To play the game blackjack, for example, the keyboard that would be utilized is illustrated in FIG. 8. Or, the user may buy the blackjack game programming in hard copy or on tape and enter it himself, either through the recorder or the keyboard into his RAM cartridge. In such instance he would also obtain a keyboard overlay for his general purpose keyboard 15.

FIG. 9 illustrates a preferred form of keyboard overlay 59, having an aperture 60 for each of the sixteen keys. The function of the key is printed on the overlay template 59, adjacent to the key as shown. Of course, if a keyboard is attached to the memory cartridge itself, it may have the function legends marked directly on each button of the keyboard.

A flow chart illustrating the program blackjack is shown in FIG. 10. The legend for the letters in the flow chart is as follows:

H is the amount of money at hand
W is the wager
P is the player's score
D is the dealer's score
I is the insurance wager
Q is the number of player aces
E is the number of dealer aces The keyboard 1 FIG. 8 which is used to play blackjack has sixteen keys, thirteen of such keys 0-9 "$" and "←" are used to enter a wager as a number into the system. The "HIT" key is a function key and provides the player with a card. The "INS" key provides the player with entry of an insurance wager. The "NO" key is used to indicate lack of desire for a "HIT" (another card), or to make an insurance wager.

The program functions to execute the game in the following manner:

Subsequent to initialization 61, the player may enter the upper limit of the amount with which the game is to be played 63. Thereafter, the player will input the amount of his wager 65. The computer then determines if the wager is less than 2. If it is, it requests the player to make a larger wager. If it is not, the computer determines if the wager is more than the upper limit of the money at hand. If it is, it requests the player to make another wager. If it is not, the computer will give the player his first card 71. Subsequent thereto, it will set the players score and number of aces he has obtained 73. Then he will give the player another card 75. Set the player's score and the number of aces he has 77.

The computer will then get a card for the dealer 79, set the dealer's score and the number of aces the dealer has 81. If the dealer has an ace 83, the player may make an insurance bet and the computer requests the player if he wants to make an insurance bet 85. If the player desires to make an insurance bet, he is instructed to enter his insurance bet 87. The computer then requests the player if he wants another card 89.

If the dealer has no ace 83, the computer immediately requests the player if he wants another card 89. If, when asked whether he wants to make an insurance bet, the player says no, the computer asks the player whether he wants another card 89. If the player decides that he wants another card, the computer will get the player another card 91 and set the player's score and number of aces.

The computer, at this time, determines if the player has blackjack 95. If the answer is yes, the player wins. If the answer is no, the computer determines if the player has more than 21, or is "busted" 97. If the answer is yes, the dealer wins. If the answer is no, the computer asks the player if he wants another card 89. This sequence will continue until the player says no, he does not want another card. At that time, the computer will get the dealer another card 103, set the dealer's score and number of aces 105.

The computer then determines if the dealer has blackjack 107. If the answer is yes, then the dealer wins. If the answer is no, the computer determines whether the dealer's score is less than or equal to sixteen 109. If the answer is yes, the computer will give the dealer another card 103, set the dealer's score and number of aces 105, etc. If the dealer has a score that is greater than sixteen, then the computer determines if the dealer has more than 21 or has "busted" 111. If the answer is yes, then the player wins. If the answer is no, then the computer determines on the basis of who has the higher score whether the player or the dealer wins 110. If the dealer wins, the amount of money left on hand to play with is the original amount minus the wager plug the insurance 99. If the player wins, the amount of money left to play with is the original amount plus the wager minus the insurance bet 113. After the money left has been calculated, the computer inquires whether the player wants to continue play 101. If the answer is yes, the player puts in a new wager. If the answer is no, the program is ended 117.

What has been described is a microprocessor-based television game or training system, which provides the user with a wide choice of game or training sequences. The system, in addition, adapts the user controls to the game or training sequence chosen by the user to be executed. The new game or training sequence chosen by the user can either be entered to be devised by the user himself. In either case, the user controls the system to easily adapt it to the game or training sequence entered by the user. It should be understood, of course, that the foregoing disclosure relates only to preferred embodiments of the invention, and that modifications may be made therein without departing from the spirit and scope of the invention as set forth in the appended claims.

What is claimed is:

1. In a programmable television game and training system including a microprocessor unit having a memory storage means connected thereto and a cartridge holding means and an operator-controlled keyboard data entry means connected to said microprocessor unit, the improvement therein comprising:

a cartridge insertable into said cartridge holding means, said cartridge including a solid state memory means for storing a source program coded in a higher level non-machine code, said solid state memory being connected to said memory means and said microprocessor when the cartridge is inserted into said cartridge holding means;

said memory storage means including an interpreter therein which is addressed by the source program in said solid state memory means, said interpreter translating the source code into machine code for execution by said microprocessor; and, a keyboard overlay for said keyboard data entry means for defining the keys on said data entry means according to the source program defined game or training sequence stored in said solid state memory means, whereby a new keyboard overlay on the keys of said data entry means redefines such keys each time that the source program in said solid state memory means is changed to define a different game or training sequence.

2. The game and training system of claim 1 wherein said solid state memory in said cartridge means is a RAM adapted to receive data from a source external to the system.

3. The improved system of claim 1 wherein said solid state memory contains a source program in Basic code and said memory storage means contains a Basic interpreter.

* * * * *